United States Patent
Kliger et al.

(10) Patent No.: US 12,430,627 B1
(45) Date of Patent: Sep. 30, 2025

(54) METHOD OF RESTRICTING A FEATURE SET OF A POINT-OF-SALE SYSTEM BASED ON NETWORK QUALITY

(71) Applicant: KWI, Greenvale, NY (US)

(72) Inventors: Sam Kliger, Mill Neck, NY (US); Jason Mueller, Massapequa, NY (US)

(73) Assignee: KWI, Greenvale, NY (US)

( * ) Notice: Subject to any disclaimer, the term of this patent is extended or adjusted under 35 U.S.C. 154(b) by 259 days.

(21) Appl. No.: 17/973,697

(22) Filed: Oct. 26, 2022

Related U.S. Application Data

(60) Provisional application No. 63/271,781, filed on Oct. 26, 2021.

(51) Int. Cl.
  *G06Q 20/20* (2012.01)
  *G06F 11/30* (2006.01)
  *H04L 43/0864* (2022.01)
  *H04L 47/283* (2022.01)

(52) U.S. Cl.
  CPC ......... *G06Q 20/20* (2013.01); *G06F 11/3055* (2013.01); *H04L 43/0864* (2013.01); *H04L 47/283* (2013.01)

(58) Field of Classification Search
  CPC . G06Q 20/20; G06F 11/3055; H04L 43/0864; H04L 47/283
  See application file for complete search history.

(56) References Cited

U.S. PATENT DOCUMENTS

| | | | |
|---|---|---|---|
| 6,178,409 | B1 | 1/2001 | Weber |
| 6,609,084 | B2 | 8/2003 | Midde Peddanna |
| 6,801,939 | B1 | 10/2004 | Chafe |
| 7,856,574 | B2 | 12/2010 | Johnson |
| 8,204,990 | B1 | 6/2012 | Avery |
| 8,493,937 | B2 | 7/2013 | Nix |
| 8,626,579 | B2 | 1/2014 | Fordyce |
| 8,708,814 | B2 | 4/2014 | Kane |

(Continued)

FOREIGN PATENT DOCUMENTS

| | | |
|---|---|---|
| AU | 2010279502 B2 | 9/2013 |
| CN | 1859227 A | 11/2006 |

(Continued)

*Primary Examiner* — Abdulkader M Alriyashi
(74) *Attorney, Agent, or Firm* — Thomas A. O'Rourke; James Bongiorno; O'Rourke IP Law, PLLC

(57) ABSTRACT

Restricting a Feature Set Using Historical Analysis of Network Quality enables a point-of-sale application (POS) to automatically determine the optimal mode of operation for its feature set based on an analysis of network traffic between the device acting as the POS and the servers hosting the services required for the features' online operations. Because certain operations require real-time interaction with services provided via the Internet (e.g. debit card payments/returns, gift card redemption/issuance, etc.), the POS does not allow the full breadth of capabilities when network connectivity quality degrades below a certain level. Instead, the POS will automatically take one of the following steps: 1. Enable the feature to use local data to accomplish its objective; 2. Disable the feature entirely. Once the network connectivity quality reaches an acceptable level for an acceptable period of time, the POS should automatically restore the full breadth of capabilities.

4 Claims, 7 Drawing Sheets

(56) References Cited

U.S. PATENT DOCUMENTS

| | | |
|---|---|---|
| 9,197,527 B2 | 11/2015 | Pauley |
| 9,240,009 B2 | 1/2016 | Koh |
| 9,730,033 B2 | 8/2017 | Jakatdar |
| 10,049,349 B1 | 8/2018 | Grassadonia |
| 10,102,591 B2 | 10/2018 | McLaughlin |
| 10,521,758 B2 | 12/2019 | Bennett |
| 2005/0021276 A1 | 1/2005 | Southam |
| 2005/0198272 A1 | 9/2005 | Bernard |
| 2006/0034185 A1 | 2/2006 | Patzschke |
| 2008/0002675 A1 | 1/2008 | Li |
| 2012/0215584 A1 | 8/2012 | Narsude |
| 2015/0302413 A1 | 10/2015 | Dua |
| 2015/0319097 A1* | 11/2015 | Hyatt ............... H04L 12/6418 709/224 |
| 2016/0155108 A1 | 6/2016 | McLaughlin |
| 2017/0236121 A1 | 8/2017 | Lyons |
| 2019/0147446 A1 | 5/2019 | Varma |
| 2020/0275350 A1* | 8/2020 | Kodaypak ............... H04W 8/08 |

FOREIGN PATENT DOCUMENTS

| | | |
|---|---|---|
| CN | 101022374 A | 8/2007 |
| CN | 101895420 A | 11/2010 |
| CN | 101645884 B | 9/2012 |
| CN | 102752170 A | 10/2012 |
| CN | 104426717 A | 3/2015 |
| CN | 102752792 B | 8/2015 |
| CN | 103227738 B | 10/2015 |
| EP | 2208311 B1 | 8/2012 |
| KR | 101200168 B1 | 11/2012 |
| KR | 20130137886 A | 12/2013 |
| KR | 101545828 B1 | 8/2015 |
| RU | 2696296 C1 | 8/2019 |
| WO | WO2011017452 A3 | 5/2011 |
| WO | WO2017086515 A1 | 5/2017 |

\* cited by examiner

Figure 1: The Gray Health Check Asynchronous Process

Figure 2: The Login Process

Figure 3: The Feature Enable/Disable Process

Figure 4: Recommendation Process When All Features are Enabled

Figure 5: Recommendation Process When All Some Features are Disabled

Figure 6: Recording Network Quality Data

METHOD OF RESTRICTING A FEATURE SET OF A POINT-OF-SALE SYSTEM BASED ON NETWORK QUALITY

CROSS REFERENCES TO RELATED APPLICATIONS

This application claims priority on U.S. Provisional Application Ser. No. 63/271,781, filed on Oct. 26, 2021, the disclosures of which are incorporated herein by reference.

BACKGROUND OF THE INVENTION

1. Field of the Invention

The present invention relates to a mechanism to determine the best possible mode of operation for a set of features within a point-of-sale (POS) application, and, more particularly, to a method of using a configurable set of algorithms to make the determination autonomous, meaning requiring no involvement from a user or administrator.

2. Description of the Related Art

Retail store locations offer customers the opportunity to purchase goods and services. The transactions that govern the exchange of these goods and services for payment are managed by a point-of-sale application (i.e. POS application). A POS application can support, depending on its level of sophistication, any number of features. The list below comprises some of the elements of a POS solution and is meant to be illustrative of the most common usages associated therewith. It is not meant to serve as an exhaustive list:

Adding Items to a Virtual Cart:

The POS needs to understand every item the customer wants to purchase as well as the price and tax associated to each. The store associate accomplishes this by scanning the barcode on the ticket attached to the item or by manually entering the sku (i.e. unique identifier associated to the item) into the appropriate screen in the POS. The system considers any relevant coupons or promotions that can be applied to one or more items in the virtual cart. An example might be that an item is on sale for 20% off. Another example might be buy one get one free of a certain item. Any coupons or promotions applicable to the transaction as a whole are also applied. An example might be spend $100 and save 10%. Once all the applicable discounts are applied, the final total is determined.

Tendering Payment:

After all items have been added and all applicable discounts applied, the final amount owed by the customer for this transaction is determined and the customer is asked to tender payment. The POS solution determines which payment types are available and the client determines what subset of these payment types they want to allow customers to use. Examples of these tender types include debit cards, credit cards, gift cards, cash, house account, etc. This list is not meant to be complete as different POS applications support different types of payments. In addition, many of these solutions expose configuration settings that allow the list of payment types to be further customized by the retail client. Once the customer chooses the form of payment, the POS device is responsible for managing the exchange of funds. As an example, if the payment method is cash, the POS will open the cash drawer and allow the associate to receive the payment and/or return any applicable change to the customer. For any other form of payment, the POS application is responsible for reaching out to the appropriate location on the Internet for processing that type of payment. For example, if the chosen form of payment is credit or debit, the POS is responsible for communicating with a payment gateway, which in turn brokers the request to a payment processor.

Capturing Customer Information

Many retail clients desire to capture various pieces of information from the customer during a sale. There are many reasons for wanting this information, including the desire to understand the demographics of their customers, what products they are interested in, how to contact them for marketing purposes, etc. During the sale, many POS solutions prompt the associate to ask for the relevant information so that it can be stored in the system with a link to the transaction currently underway.

Controlling Associate Behavior

All retail clients require authorization configuration in order to be able to control what associates have the ability to access certain features. For example, a store associate might not be allowed to do a cash refund or access certain fiscal reports. Instead, a manager override might be required in order for the system to allow access to that behavior or information.

In the case of all the features listed above, and many others not listed, the POS device in the store requires access to configuration information, data, and web services relevant to the action it is trying to take. As the use of private and public clouds has skyrocketed over recent years, POS vendors, payment gateways and processors have been making more and more functionality available over the Internet. Payment Installment solutions such as Klarna or AfterPay are excellent examples. POS vendors are incorporating this new functionality into their offerings and as they have done so, have become increasingly reliant on internet availability and performance in order to deliver on a robust experience for their clients.

Unfortunately, despite significant improvements in consistency and speed, the Internet is not always available, nor does it always deliver an experience of sufficient speed and quality to support a realtime transaction such as is required of a retail sale.

Below is a partial list of potential issues with which any Internet based service or application must deal. It is not meant to be comprehensive of all Internet-based problems, but rather illustrative of scenarios with which a POS application might be forced to contend:

Full Outage

In this scenario, the retail store cannot contact any external site via the Internet. It is most likely due to an issue with the store's router, or a failure at the Internet provider. Regardless of the underlying cause, the POS application is not able to: successfully request or send any data to any location via the Internet.

Regional Outage

In this scenario, the retail store cannot contact a subset of sites available via the Internet. Most often, these are caused by infrastructural issues such as power outages, fiber cuts, or physical damage to a data center but can also result from configuration issues or software failures. If the retail store can still contact all of the end points necessary to support the application, there will be no interruption experienced by the POS application. However, if one or more of the end points required by the POS application fall within the scope of a regional outage, the POS application can be significantly handicapped. As an example, in the case where the POS cannot contact the end points necessary to support card-based payments (e.g. credit cards, debit cards, gift cards, etc.), the POS application would be reduced to accepting only cash sales.

Packet Loss

In this scenario, the POS can reach the end point it is attempting to contact, but part of the data it is attempting to send or receive is lost during the transmission. In virtually all cases, the loss of any information during the exchange will cause the operation to fail. Most POS applications have retry logic built in, which will allow the application to try the operation a second, or potentially, a third time. However, if the issue causing the packet loss persists, these subsequent attempts will also fail, resulting in a scenario similar to the regional or full outage scenarios.

Jitter

Over computer networks, all communication is broken down into small pieces of data called packets. When these packets arrive in a continuous and consistent manner, it is straightforward for the receiving system to reassemble the packets and parse the request being sent. If however, these packets do not arrive in a consistent manner, the transmission is said to be experiencing jitter. If the jitter is significant enough, the request cannot be reassembled by the receiving system and the operation being requested by the POS application will fail in a manner similar to that of packet loss.

Latency

Similar to jitter, latency is related to the amount of time it takes for packets to traverse the Internet and arrive at their destination. Unlike the variability in the amount of time it takes for each packet to arrive as it does when a network is experiencing jitter, latency refers to the network condition where each packet experiences a consistent delay before delivery. In the case of low-latency conditions, the request is received within plenty of time for it to be reassembled and parsed. Under high-latency conditions however, the receiving system will give up under the assumption that the missing information will never arrive, which, in actuality, may or may not be the case. Regardless, the receiving system abandons the attempt to reassemble the packets, and the operation being requested by the POS application will fail in a manner similar to that of jitter or packet loss.

For modern POS applications taking advantage of the ever-increasing set of complementary technologies made available via the Internet, it is imperative that these applications ensure a viable set of functionality to the associate when one or more of the network interruptions described above impacts the operation of the application.

SUMMARY OF THE INVENTION

The Abstract, along with this Summary, is meant to introduce concepts used during the Detailed Description section. It is not intended to be comprehensive, nor is it meant to entirely capture the breadth of protectable subject matter listed in the claims section.

Restricting a Feature Set Using Historical Analysis of Network Quality enables a point-of-sale device to autonomously and automatically determine the optimal method of operation for a set of features based on a heuristic analysis of previous traffic between the device acting as the point-of-sale application (POS) and the network services required for its online operation. As mentioned in the abstract, the optimal mode is the mode where all features are available via connectivity to online services. However, in situations where network issues prevent an acceptable experience, one or more features will be moved to a mode where they leverage local data to accomplish their objectives, or disabled entirely.

In order to make this determination without intervention from the store associate, an asynchronous process within the POS application communicates network quality data between the POS application and multiple endpoints to a web service where a set of configurable algorithms evaluate the data across a configurable range of time and communicate a recommendation in the response. At the start of the next transaction (e.g. sale, return, inventory transfer, etc.), the mode of operation for each feature is set leveraging the response returned to the device. The device continues to compile the network quality data regardless of the state of any of its features and whenever possible, will send it to the web service for future network quality evaluations. This invention requires a software modification to the POS application running inside the retail store and additional web services running in KWI's private cloud. No additional hardware is necessary for the solution.

Once the quality of the connection between the device and all the services it requires for full operation reach an acceptable level for a configurable period of time, the service will instruct the POS application to provide the associate access to all features via their online web service implementation.

There are a number of features which can be enabled/disabled independently or jointly depending on the recommendation of the gray health check. These features include:

Credit Card Payments: Are payments made via realtime calls to the payment gateway, or are they stored locally until internet connectivity returns?

Debit and Gift Card Payments: These payments require realtime authorization. As such, they are either enabled for realtime calls to the payment gateway, or disabled and blocked from use Customer lookup: Will a customer search use a realtime web service call to the complete list of customers stored in KWI's private cloud, or will it do a local lookup into the database on the POS device, which may contain a subset of customers, or older data?

Edit Customer: Will the POS edit a local copy of the customer info and store it for upload when internet connectivity returns, or will the POS make a realtime web service call and update the customer information stored in KWI's private cloud?

Add Customer: Will the POS create a local copy of the new customer's info and store it for upload when internet connectivity returns, or will the POS make a realtime web service call and create the customer information in KWI's private cloud?

DETAILED DESCRIPTION

The section below provides specific details of the components in order to provide a comprehensive understanding of the invention. However, it is not meant to convey every approach, algorithm, design pattern, procedure, or protocol. For the ones considered well-known, they will not be listed here so as not to interfere with the unique features of the invention.

Also, as used throughout this specification, the word "may" is used in a permissive sense (i.e., meaning having the potential to), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, it is noted that the citing of any reference within this disclosure, i.e., any patents, published patent applications, and non-patent literature, is not an admission regarding a determination as to its availability as prior art with respect to the herein disclosed and claimed method/apparatus.

Furthermore, any reference made throughout this specification to "one embodiment" or "an embodiment" means that a particular feature, structure, or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Figure 1:
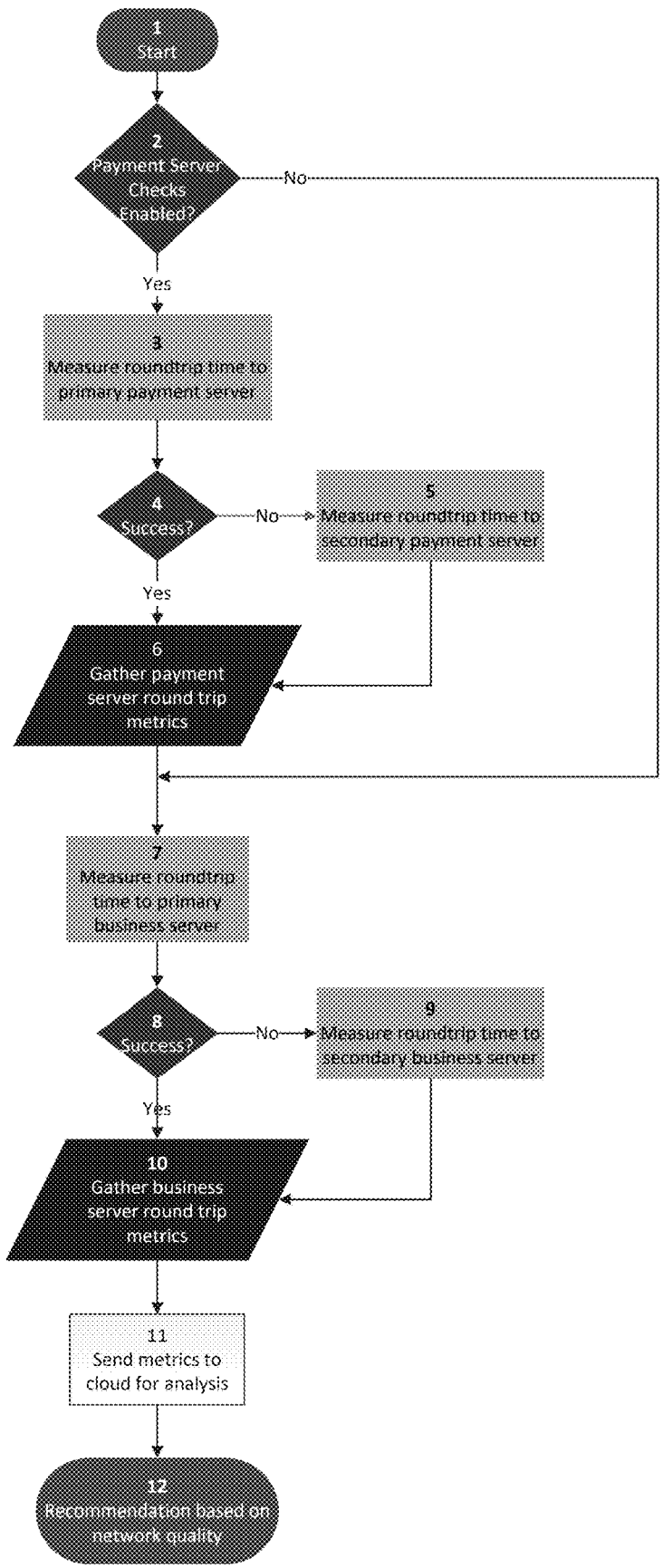
FIG. 1 is a flowchart of the asynchronous process running on the POS application used to collect the network quality data and forward it to the web service. The web service will make an assessment of the data and return a recommendation about which features to enable/disable to the POS application.

FIG. 1—The Gray Health Check Asynchronous Process describes the process that runs on the POS device. An asynchronous, or background, process runs at a configurable interval without interfering with other operations, so the associate using the POS application remains unaware that this process is running.

The first operation (Step 2) checks to see if the configuration that controls whether to check the network quality between the device hosting the POS and the payment server is enabled. If it is not, processing continues by checking the network quality between the device hosting the POS and the business server (Step 7). If the configuration is enabled, it measures the amount of time it took to contact the primary payment server (Step 3). If the primary payment server cannot be reached, the process is repeated using the secondary payment server (Step 5).

Once network quality between the POS and the payment server is complete, processing moves on to measure the network quality between the device hosting the POS and the business server (Step 7). If the primary business server cannot be reached, the process is repeated using the secondary business server (Step 9).

Once the metrics for network quality between the device hosting the POS and the business server (Step 10) and optionally, the metrics for network quality between the device hosting the POS and the payment server (Step 6) have been collected, they are sent to a web service for analysis (Step 11). The web service returns a recommendation for which features to enable fully, which to use with local files, and which to disable completely (Step 12).

This process is executed asynchronously (in the background without requiring any interaction with the associate using the POS) on an interval as defined in the configuration.

Figure 2:
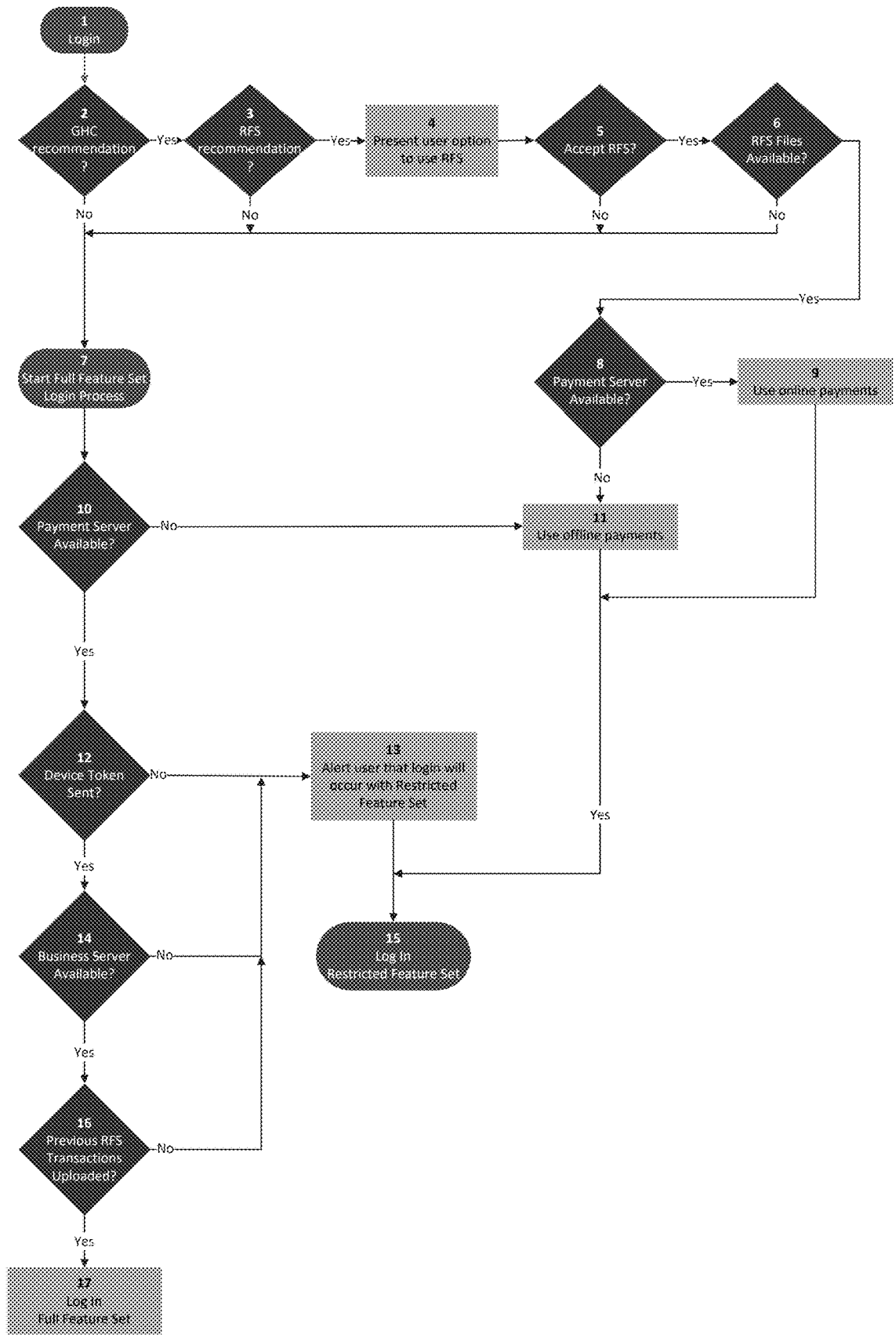
FIG. 2 is a flowchart of the login process. This process is executed at that start of any transaction (e.g. sale, return, transfer, report, etc.) executed by the POS application and is the inflection point at which the network quality data result sent by the web service is ingested by the POS application and based on that recommendation, enables or disables the relevant features.

FIG. 2—The Login Process describes the set of steps performed at the start of each session to automatically and autonomously determine which features should be enabled for the POS application given the recommendation made after analysis of the network quality data. A session is defined as an interaction between the store associate and the POS device for the completion of any task (e.g. ringing up a sale, transferring inventory from one location to another, running a report, etc.).

The first check the login process makes is to see if there was a recommendation returned to the Gray Health Check Asynchronous Process (FIG. 1). This check is done in Step 2.

Scenario 1 (No Recommendation was provided)—If no recommendation was provided to the Gray Health Check Asynchronous Process (FIG. 1), the login process proceeds to start the full feature set login process (Step 7). The first check it makes is in Step 10, where it makes a call to the payment server to see if it is available.

Scenario 2 (Payments must be done offline)—If Step 10 returns that the payment server is unavailable, the POS will allow the login but will use the offline payment feature set rather than making a realtime webservice call to the payment gateway (Step 11). A screen is presented to the associate informing them that the POS will be using a restricted set of features (Step 13). Once the user dismisses that screen, the login completes (Step 15)

Scenario 3 (Receiving a token fails)—If Step 10 returns that the payment server is available, the POS will proceed to see if it can exchange a device token with the KWI private cloud (Step 12). If that fails, a screen is presented to the associate informing them that the POS will be using a restricted set of features (Step 13). Once the user dismisses that screen, the login completes (Step 15).

Scenario 4 (The business server is unavailable)—If Step 12 returns that the device token was successfully exchanged, the POS will proceed to see if it can contact the business server (Step 14). If that fails, a screen is presented to the associate informing them that the POS will be using a restricted set of features (Step 13). Once the user dismisses that screen, the login completes (Step 15).

Scenario 5 (The previous transactions could not be uploaded)—If Step 14 returns that the business server is available, the POS will proceed to see if it can upload any transactions previously stored on the device during restricted file set operation (Step 16). If that fails, a screen is presented to the associate informing them that the POS will be using a restricted set of features (Step 13). Once the user dismisses that screen, the login completes (Step 15).

Scenario 6 (All features fully available)—If Step 16 returns that the business server is available, the POS will proceed to complete the login without restricting any features or presenting a screen to the associate (Step 17).

Scenario 7 (The Gray Health Check Returns a Recommendation)—If the process receives a response when it queries the gray health check to see if it has a recommendation (Step 2), it then proceeds to parse the response to see if a restricted feature set is recommended (Step 3). If a restricted feature set is not recommended, processing proceeds with the full feature login: (Step 7). Otherwise, a dialog is displayed to the associate asking if they want to use a restricted feature set (Step 4). If the associate responds to the negative (Step 5), processing resumes with the full feature set login attempt (Step 7). If the associate responds to the positive (Step 5), the POS first needs to make sure that all files required for the restricted feature set have been downloaded to the device (Step 6). If the required files have not been downloaded (Step 6), processing resumes with the full feature set login attempt (Step 7). If all required files are on the device (Step 6), the login process checks to ensure the payment server is available (Step 8). If it is not, payments will be done offline (Step 11) and the login will complete with Step 15. If the payment server is available, payments will be done online (Step 9) and the login will complete with Step 15.

Figure 3:
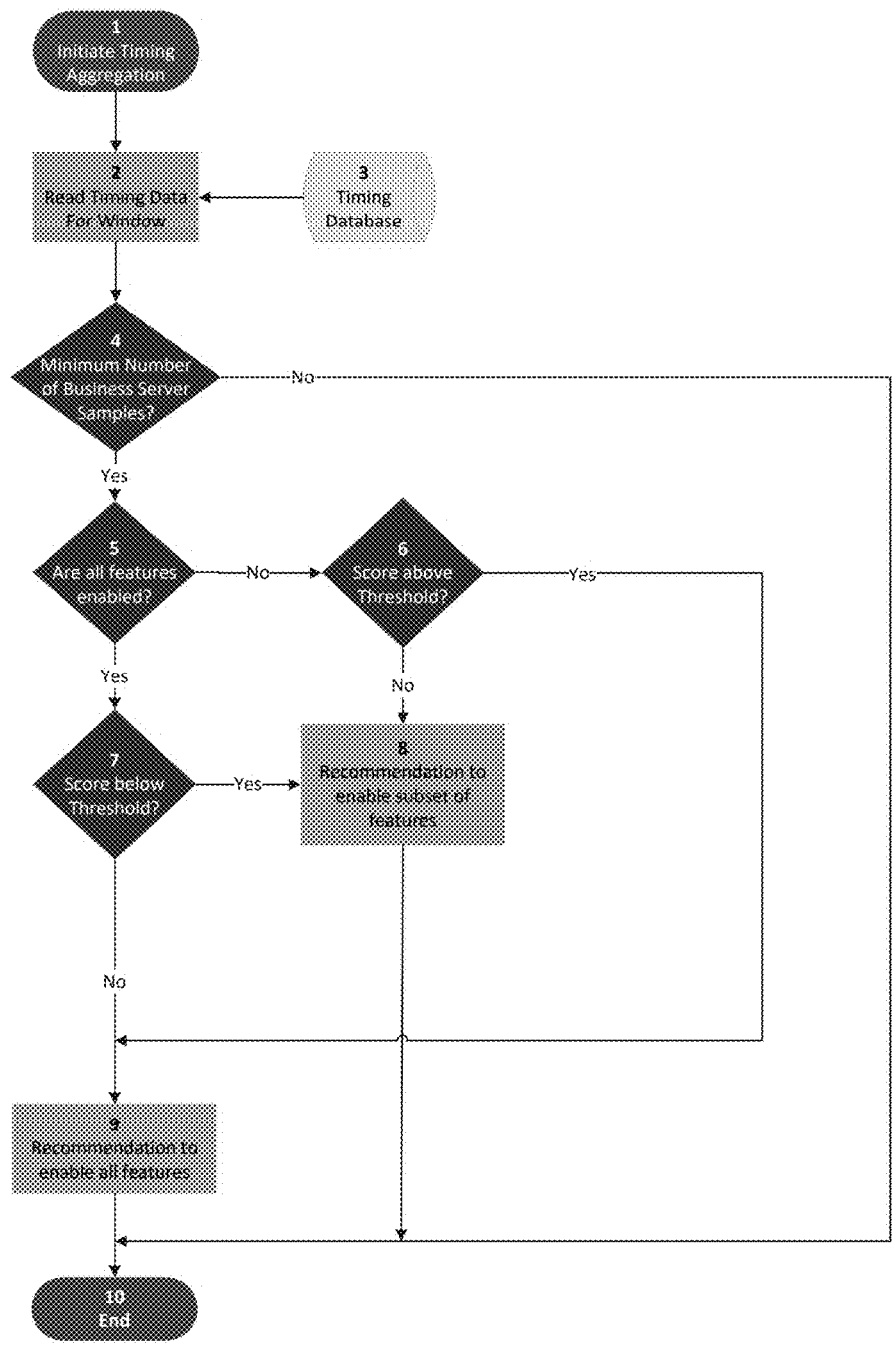
FIG. 3 is a flowchart of the process that accepts the network quality data from the POS application, analyzes it using its algorithms and its configuration parameters and sends a result that the POS application will interpret and leverage to make the appropriate changes to feature operation and availability.

FIG. 3—The Feature Enable/Disable Process is a process that runs in a datacenter collocated with the network quality data collected from each POS application. It runs according to a configurable interval. When the process starts, it reads in the network quality data associated with an individual POS's connectivity to the business server (Step 2) from the database that stores this data (Step 3). The process then checks to see if it has the minimum number of samples required to issue a recommendation (Step 4). If it does not, the process exits without making a recommendation (Step 10). If it does have the minimum number of samples required to issue a recommendation (Step 4), it proceeds to check the state of available features for the POS (Step 5).

If the POS has features disabled, the network quality must exceed a configurable threshold to restore the availability of those features. That check is done in Step 6. If the threshold is exceeded (Step 6), the process will return a recommendation to enable all features (Step 9). If the score is below the threshold (Step 6), the process will return a recommendation to disable a subset of features (Step 8).

If the POS has all features enabled (Step 5), the network quality must degrade below a configurable threshold in order for the process to recommend a subset of features be disabled. This check is done in Step 7. If the network quality data does in fact fall below the configurable threshold (Step 7), the process will recommend that a subset of features be disabled (Step 8). If the network quality data is good enough not to fall below this configurable threshold (Step 7), the process will return a recommendation to enable all features (Step 9).

Figure 4:
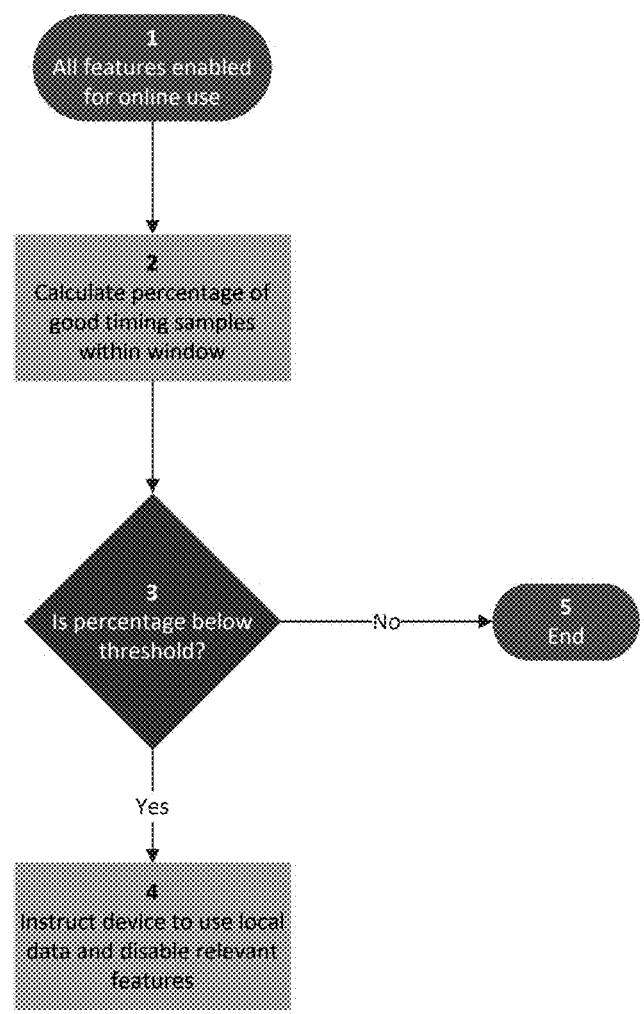
FIG. 4 is a flowchart of the process described in FIG. 3, Steps 5 and 7 and gives further insight into the process used to determine the result that the POS application will interpret and leverage to make the appropriate changes to feature operation and availability.

FIG. 4—The Recommendation Process When All Features Are Enabled is the algorithm from FIG. 3, Step 6, wherein the determination of whether the samples of network quality sent to the web service by the POS application meet the configurable threshold (Step 3) that will result in a recommendation to disable one or more features (Step 4). The algorithm to do this is as follows:

1. Retrieve relevant configuration values (i.e. minimum length of time, minimum number of samples, threshold for acceptable performance, minimum acceptable percentage)
2. Calculate if the database contains a number of samples within the minimum length of time equal to or greater than the minimum number of samples required.
3. If there are enough samples within the configurable window defined in step 2, calculate the percentage of those samples that exceed the threshold for acceptable performance
4. Compare the percentage of actual samples to the minimum acceptable percentage. Use the comparison in Step 3.

An Example:

The Administrator sets the following configuration settings:

Minimum length of time: 10 minutes
Minimum number of samples: 5
Threshold for acceptable performance: 50 milliseconds
Minimum acceptable percentage: 60%

The POS application reports the following information for its evaluation of roundtrip data:

| | |
|---|---|
| 10:00:00 | 47 milliseconds |
| 10:02:00 | 42 milliseconds |
| 10:04:00 | 48 milliseconds |
| 10:06:00 | 47 milliseconds |
| 10:08:00 | 43 milliseconds |
| 10:10:00 | 45 milliseconds |

When the process runs at 10:10:00, it first checks to see if it has enough samples. In this example, it collected 6 samples in the last 10 minutes. That exceeds the 5 (minimum number of samples) in the last 10 minutes (minimum length of time). Since all samples fall below the 50 millisecond goal (threshold for acceptable performance), the process determines that it does not need to recommend disabling any features.

Figure 5:
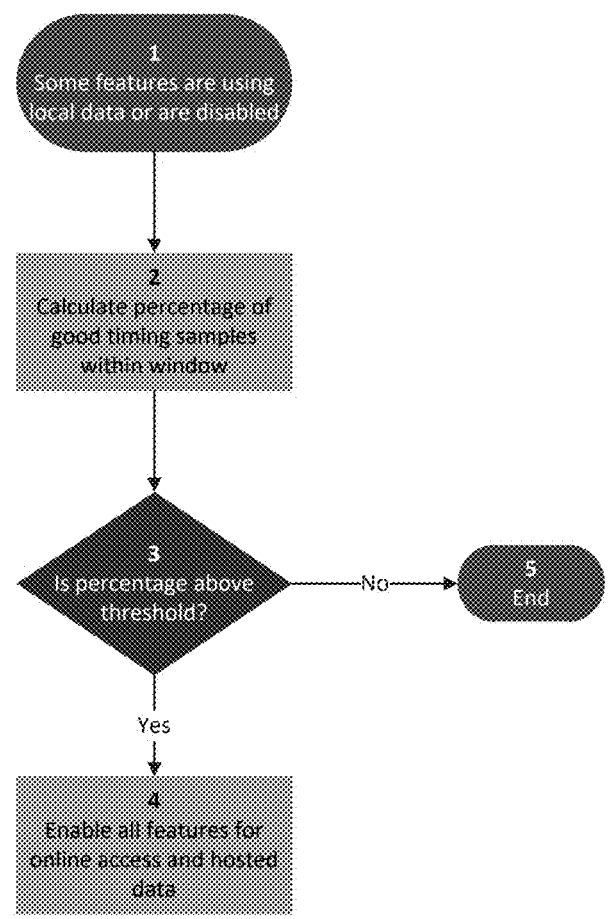
FIG. 5 is a flowchart of the process described in FIG. 3, Steps 5 and 6 and gives further insight into the process used to determine the result that the POS application will interpret and leverage to make the appropriate changes to feature operation and availability.

FIG. 5—The Recommendation Process When Some Features Are Disabled is the algorithm from FIG. 3, Step 12, wherein the determination of whether the samples of network quality sent to the web service by the POS application meet the configurable threshold (Step 3) that will result in a recommendation to enable all features (Step 4). The algorithm to do this is as follows:

1. Retrieve relevant configuration values (i.e. minimum length of time, minimum number of samples, threshold for acceptable performance, minimum acceptable percentage)
2. Calculate if the database contains a number of samples within the minimum length of time equal to or greater than the minimum number of samples required.

3. If there are enough samples within the configurable window defined in step 2, calculate the percentage of those samples that fall below the threshold for acceptable performance
4. Compare the percentage of actual samples to the minimum acceptable percentage. Use the comparison in Step 3.

An Example:

The Administrator sets the following configuration settings:

Minimum length of time: 10 minutes
Minimum number of samples: 5
Threshold for acceptable performance: 50 milliseconds
Minimum acceptable percentage: 60%

The POS application reports the following information for its evaluation of roundtrip data:

| | |
|---|---|
| 10:00:00 | 57 milliseconds |
| 10:02:00 | 42 milliseconds |
| 10:04:00 | 48 milliseconds |
| 10:06:00 | 47 milliseconds |
| 10:08:00 | 43 milliseconds |
| 10:10:00 | 45 milliseconds |

When the process runs at 10:10:00, it first checks to see if it has enough samples. In this example, it collected 6 samples in the last 10 minutes. That exceeds the 5 (minimum number of samples) in the last 10 minutes (minimum length of time). Since all samples fall below the 50 millisecond goal (threshold for acceptable performance), the process determines that it can recommend to re-enable all features.

Figure 6:
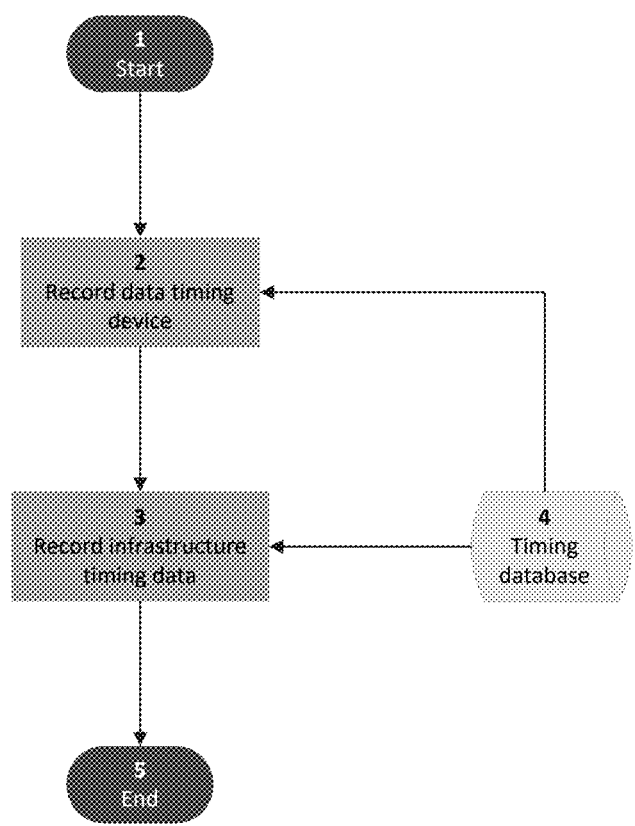
FIG. 6 is a flowchart of the process used to record the network quality evaluation data for use by the Feature Evaluation process described in FIG. 3.

FIG. 6—The Recording Network Quality Data process accepts network quality data from the POS application (Step 2) and data captured from the performance of the infrastructure's internal systems (Step 3) and records them in The Timing database (Step 4). This combination of data is used by the processes in FIGS. 4 and 5 and when combined with the configurable thresholds, ultimately determines the recommendations sent to the POS application.

Figure 7:
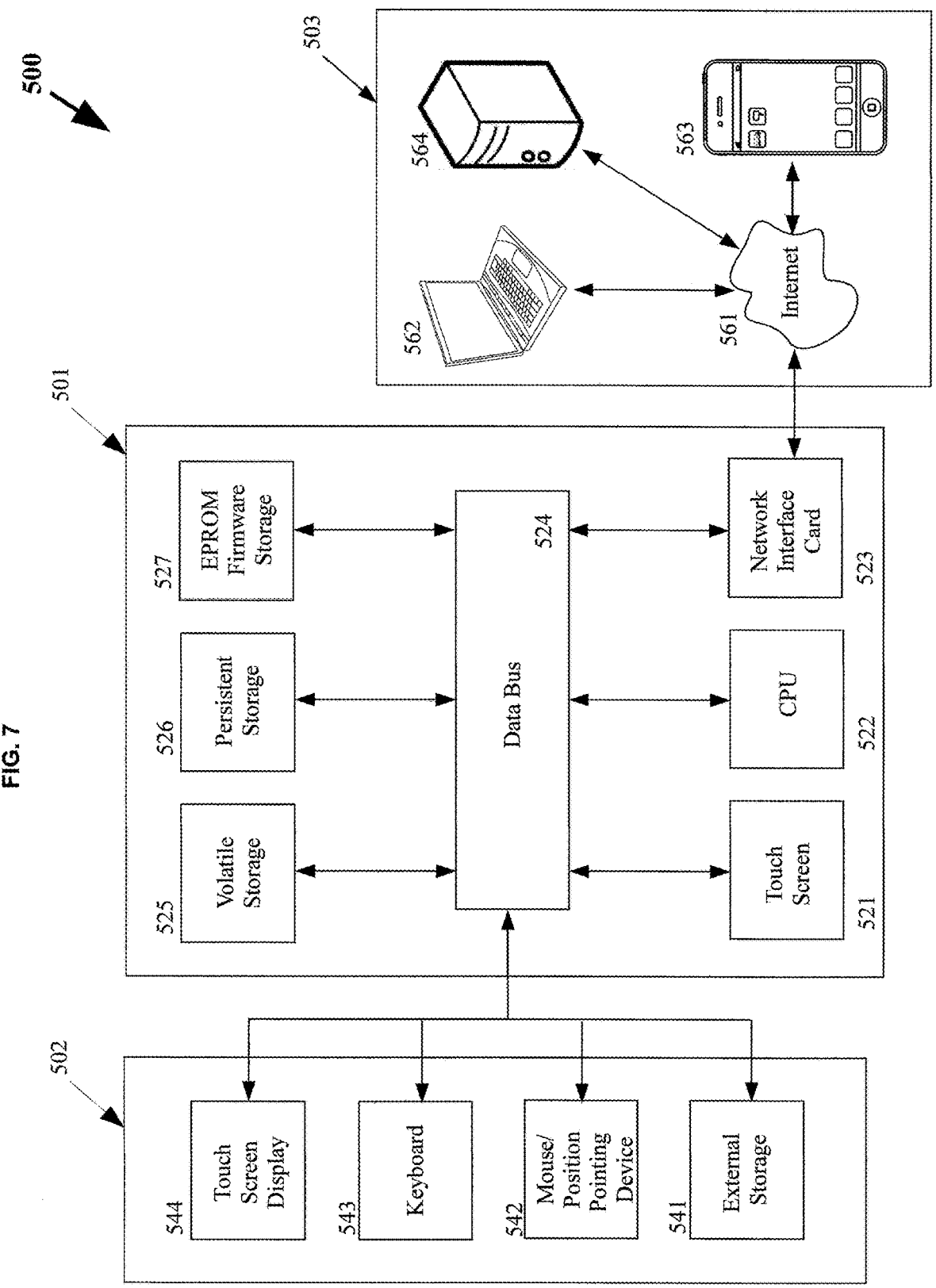
FIG. 7 is a schematic illustration showing an exemplary computing unit capable of being programmed by the instructions of the software that may be part of the present invention, and which may include personal computers, cellular phones, and other mobile computing devices.

Software to provide the herein disclosed GUI functionality may run on a suitable computing device, such as a server, a tablet, a cell phone, and/or another mobile smart device, so a description of such an accessorized exemplary computer system is hereinafter disclosed, even though a particular embodiment may not require all of the described components. Exemplary computer system 500 (i.e., a client device associated with a particular user) is shown schematically in FIG. 7, and which may comprise computing unit 501 interacting with external peripherals 502, such as a separate touch screen display 544, and interacting with network resources 503, including use of the internet 561, and other computers (or other client devices or a server), which may be a laptop computer 562 (i.e., a second client device associated with a second user), a smart phone 563 (i.e., a third client device associated with a third user), a server 564, etc.

The computing unit 501 may include a data bus 524 for communicating information across and among various parts of computing unit 501, and a central processing unit, which may be a microprocessor (hereinafter "processor" or "CPU") 522 coupled with a bus 524 for processing information and performing other computational and control tasks. Computing unit 501 may also include a volatile storage 525, such as a random access memory (RAM) or other dynamic storage device, coupled to bus 524 for storing various information as well as instructions to be executed by processor 522. The volatile storage 525 may also be used for storing temporary variables or other intermediate information during execution of instructions by processor 522. Computing unit 501 may further include a read only memory (ROM) or an erasable programmable memory (EPROM) 527 or other static non-transitory storage device coupled to bus 524 for storing static information and instructions for processor 522, such as basic input-output system (BIOS), as well as various system configuration parameters. A persistent storage device or non-volatile memory 526, such as a magnetic disk, optical disk, or solid-state flash memory device may be provided and may be coupled to bus 524 for storing information and instructions.

Computing unit 501 may be coupled via bus 524 to an integral display 521, possibly a touch-screen display, for use in displaying information to a user. If desired, computing unit 501 may be coupled via bus 524 to an external display screen 544. An external input device 543 (e.g., a standard keyboard) may be coupled to bus 524 for communicating information and command selections to processor 522. A cursor control device 542, such as a mouse, a trackball, or cursor direction keys, may be used for communicating direction information and command selections to processor 522 and for controlling cursor movement on display 544. An external storage device 541 may be connected to the computing unit 501 via bus 524 to provide an extra or removable storage capacity for the computing unit 501, which may be used to facilitate exchange of data with other computer systems.

Some of the techniques herein may be performed by computing unit 501 in response to processor 522 executing one or more sequences of one or more instructions contained in the volatile memory 525. Execution of the sequences of instructions contained in a non-transitory memory may cause processor 522 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 522 for execution. The computer-readable medium is just one example of a machine-readable medium, which may carry instructions for implementing any of the methods and/or techniques described herein. Various forms of computer readable media may contain one or more sequences of one or more instructions for the processor 522 to execute, including non-volatile media (storage device 526), and volatile media (storage device 525). Common forms of non-transitory computer-readable media include, for example, a floppy disk, a hard disk, magnetic tape, or any other magnetic medium, a CD-ROM, a flash drive, and a memory card.

The computing unit 501 may thus also include a communication interface, such as network interface card 523 coupled to the data bus 522. Communication interface 523 may provide a two-way data communication coupling to a network link that may be connected to a local network. For example, communication interface 523 may be an integrated services digital network (ISDN) card or a modem to provide a data communication connection to a corresponding type of telephone line, or it may be a local area network interface card (LAN NIC) to provide a data communication connection to a compatible LAN.

Network link 523 also typically provides data communication to other network resources. For example, the network link may provide a connection over the internet 561 to the world-wide-web. Thus, the computing unit 501 can access resources located anywhere using the Internet 561. Also, the computing unit 501 may also be accessed by, or communicate with, other computers (e.g. 562), or another smart device (e.g., smartphone 563), generally with permission, and which may be located anywhere with access to the internet 561.

What is claimed is:

1. A method of restricting a feature set of a point-of-sale (POS) system based on network quality, said method comprising the steps of:
   performing a network health check comprising:
   (a) checking to see if a configuration setting controlling initiating of checking the network quality between a device hosting the POS system and a primary payment server is enabled;
   (b) toggling the configuration setting for checking the network quality between the device hosting the POS and the primary payment server when it is not enabled;
   (c) measuring a roundtrip time from the POS system to the primary payment server, and wherein when said measuring is successful, gathering primary payment server roundtrip metrics, and wherein when said measuring is not successful, measuring a roundtrip time from the POS system to a secondary payment server and gathering secondary payment server roundtrip metrics;
   (d) measuring a roundtrip time from the POS system to a primary business server and wherein when said measuring of the roundtrip time from the POS system to the primary business server is not successful, measuring the roundtrip time from the POS system to the secondary payment server; and gathering business server roundtrip metrics;
   (e) analyzing the primary payment server roundtrip metrics, the secondary payment server roundtrip metrics, and the business server roundtrip metrics;
   (f) recommending a best mode of operation for the POS system in response to the primary payment server roundtrip metrics, the secondary payment server roundtrip metrics, and the business server roundtrip metrics are received and analyzed, said recommending comprising: recommending which features to enable fully, recommending which features to use with local files, and recommending which features to disable completely; and
   (g) repeating steps (a) through (f) periodically at an interval defined in a user-defined configuration setting.

2. The method according to claim 1, further comprising:
   logging into the POS system by a store associate by initiating a store task;
   wherein upon said initiating of a store task, checking if said performing of the network health check returned a recommendation;
   wherein when said performing of the network health check returned a recommendation, determining if all features are unrestricted;
   wherein when all features are unrestricted, permitting a complete login by the store associate; and
   wherein when one or more features are not recommended, displaying a dialog box asking if using a restricted feature set is acceptable, and wherein when the restricted feature set is unacceptable, attempting a full feature set login, and wherein when the restricted feature set is acceptable, checking by the POS system if all required files for the restricted feature set are downloaded, and completing payments offline when the required files are downloaded.

3. The method according to claim 1, further comprising:
   logging into the POS system by a store associate by initiating a store task;
   wherein upon said initiating of a store task, checking if said performing of the network health check returned a recommendation;
   wherein when said performing of the network health check returned a recommendation, determining that either the primary payment server or the secondary payment server is available, attempting, by the POS system, to exchange a device token with a private cloud associated with the POS system, and wherein when the exchange fails, displaying a message indicating using by the POS system of a restricted set of features, and completing the login.

4. The method according to claim 3, wherein said initiating of a store task comprises:
   initiating of one or more of: ringing up a sale, transferring inventory from one location to another, and running a report.

* * * * *